United States Patent [19]

Andrews

[11] Patent Number: 4,558,979
[45] Date of Patent: * Dec. 17, 1985

[54] FASTENING DEVICE

[76] Inventor: Gary E. Andrews, 5199 Priorybrook Rd., Florissant, Mo. 63033

[*] Notice: The portion of the term of this patent subsequent to Feb. 14, 2001 has been disclaimed.

[21] Appl. No.: 578,772

[22] Filed: Feb. 9, 1984

Related U.S. Application Data

[63] Continuation-in-part of Ser. No. 306,139, Sep. 28, 1981, Pat. No. 4,431,352.

[51] Int. Cl.[4] .............................................. B23B 43/00
[52] U.S. Cl. ........................................ 410/101; 16/2; 248/499; 248/500; 403/164; 410/85
[58] Field of Search ................. 248/500, 499, 503.1, 248/505, 59; 403/119, 164; 24/115 K; 16/2, DIG. 33; 410/101, 112, 113, 114, 85

[56] References Cited

U.S. PATENT DOCUMENTS

| 240,380 | 4/1881 | Buck | 403/164 |
|---|---|---|---|
| 3,273,946 | 9/1966 | Gerner | 403/119 |
| 3,297,293 | 1/1967 | Andrews et al. | 248/499 |
| 3,504,937 | 4/1970 | Panovic | 403/164 |
| 4,074,519 | 2/1978 | Garret | 248/499 |
| 4,295,765 | 10/1981 | Burke | 410/101 |
| 4,431,352 | 2/1984 | Andrews | 248/499 |

Primary Examiner—Ramon S. Britts
Assistant Examiner—Ramon O. Ramirez
Attorney, Agent, or Firm—Cohn, Powell & Hind

[57] ABSTRACT

This fastening device provides a self-contained, tie-down unit by means of which load from a swivel eye is transferred to a base. The fastening device includes a stud, threadedly connectible to a base and mounting a collar and a retainer member. The retainer member supports a bushing member, and the bushing member and collar provide a swivel mount for the load ring. The bushing member and stud cooperate to transfer variable loadings into the base in a manner predictable from their size and configuration.

15 Claims, 8 Drawing Figures

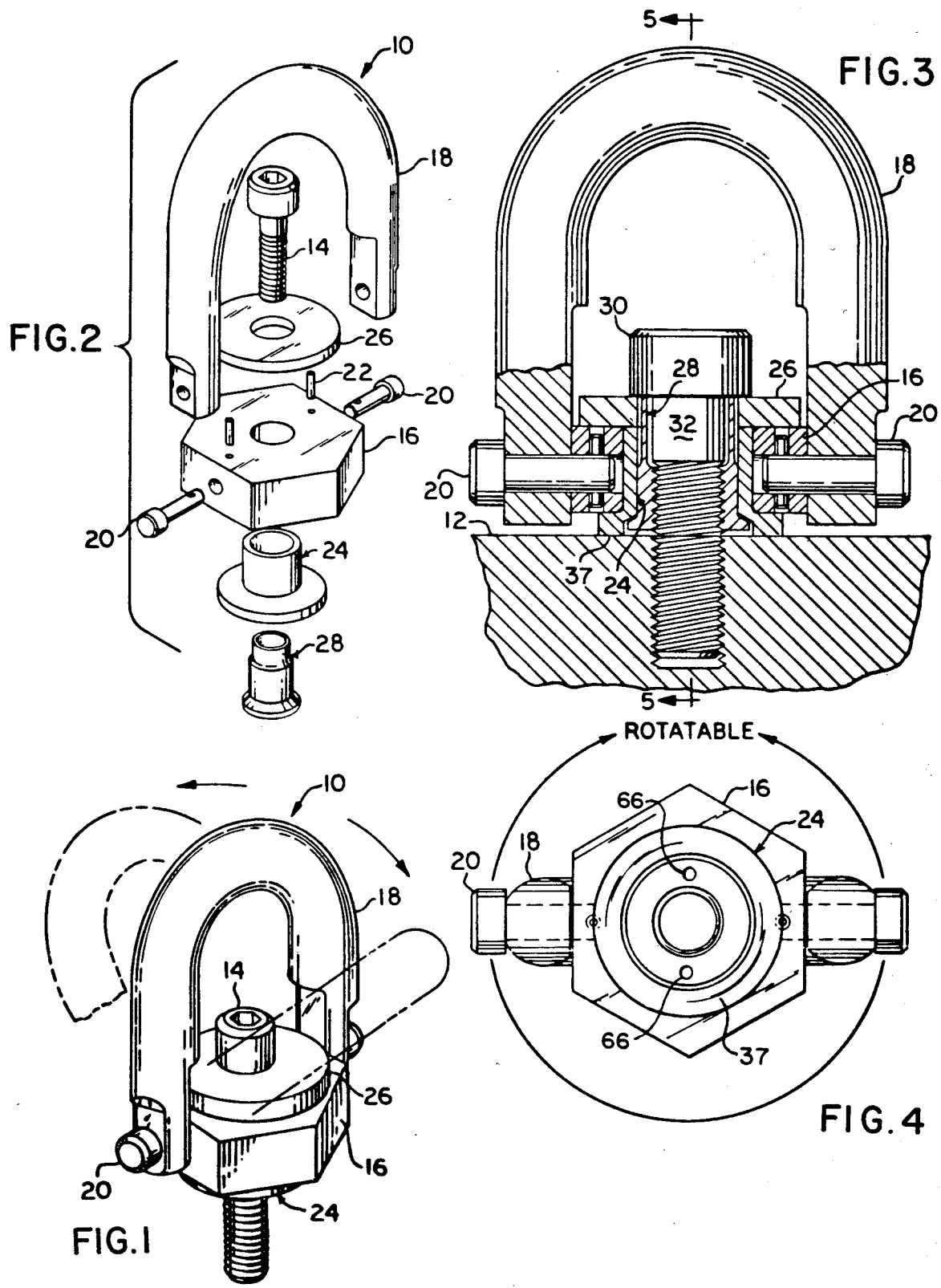

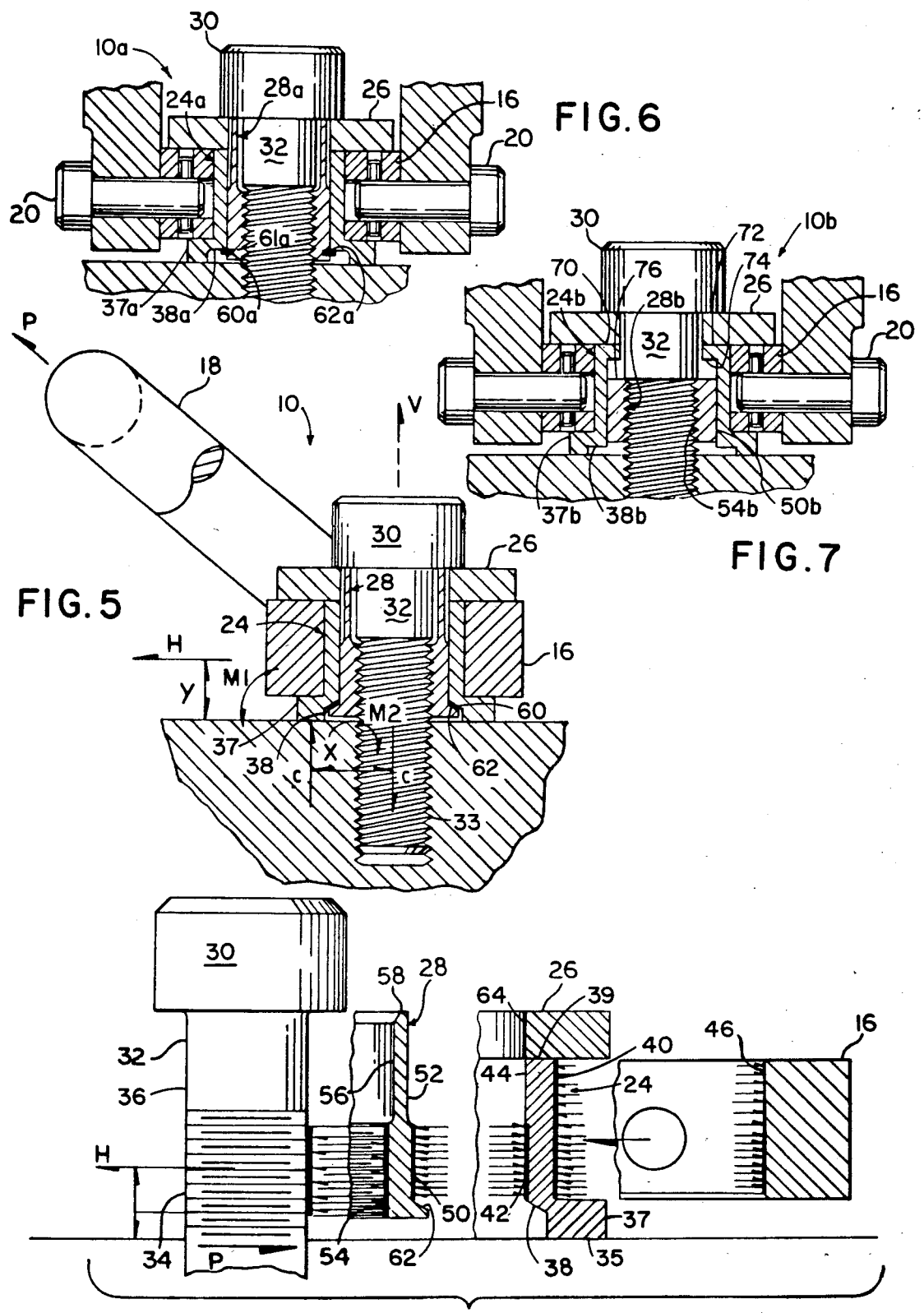

FASTENING DEVICE

RELATED U.S. APPLICATION DATA

Continuation-in-part of Ser. No. 306,139, Sept. 28, 1981, now U.S. Pat. No. 4,431,352.

BACKGROUND OF THE INVENTION

This invention relates generally to a fastening device and more particularly to an improved, swivel tie-down unit.

Tie-down units of the type under consideration are widely used for a variety of purposes such as providing hold-downs for airplanes, trucks and containers for cargo carried by trucks and for providing lifting eyes for engine blocks and similar items.

In particular, the fastening device which forms the subject matter of this invention represents an improvement over U.S. Pat. No. 3,297,293. Although the fastening device disclosed in this patent has proven effective for its intended purposes it has a relatively high load transfer center. In addition, the retaining element used to hold the fastener device in assembly prior to installation requires the use of a grooved stud and retaining rings.

SUMMARY OF THE INVENTION

This fastening device provides a tie-down unit having an improved load distribution system and an improved system for maintaining the unit in assembly prior to installation.

The fastening device includes a stud having a head and a shank, the shank having a lower threaded portion adapted to be fastened to the base and an upper, adjacent threaded portion; a retainer member including an inner surface having a threaded portion, adapted to be received by the stud upper threaded portion, and an outer surface having a bearing portion; a bushing member including an inner surface having a bearing portion operatively engageable with the outer bearing portion of the retainer member and an end bearing portion operatively engageable with the base; interengageable means on each of said members engageable to limit relative longitudinal movement between said members for maintaining the unit in assembly prior to installation.

In one aspect of the invention the retainer member outer surface bearing portion is cylindrical and the bushing member inner and outer bearing surfaces are cylindrical.

In another aspect of the invention the retainer member inner surface includes a cylindrical portion providing the threaded portion and the retainer member outer surface includes a cylindrical portion providing the bearing portion and the bushing member inner surface includes a cylindrical lower portion providing the bearing portion whereby to effectuate lowering the applied load and improving the load distribution system.

In another aspect of the invention the retainer member inner surface includes a cylindrical portion providing the threaded portion and the retainer member out of service includes a cylindrical lower portion providing the bearing portion.

It is still another aspect of this invention that the interengageable means between the bushing member and the retainer member includes a circumferentially disposed transverse bearing face provided on one of said members and an overlappingly related transverse abutment face provided on the other of said members.

In yet another aspect of the invention the interengageable means includes an annular transverse bearing face provided in one of said members and a cooperating annular bearing face provided on the other of said members.

In another aspect of this invention the bushing member includes a recessed annular abutment providing the transverse bearing face and the retainer member includes an outwardly extending annular flange providing the transverse bearing face.

In still another aspect of this invention the bushing member bearing face and the retainer member bearing face are inclined relative to the axis of the stud.

In one aspect of this invention the retainer member includes an exterior retaining ring providing the annular flange. In still another aspect of this invention the bushing member includes an inwardly extending flange providing the transverse bearing face and the retainer member includes a cylindrical nut having an upper annular margin providing the retainer member transverse bearing face.

In another aspect of this invention the retainer member has a length substantially less than the length of the bushing member.

BRIEF DESCRIPTION OF THE DRAWINGS

FIG. 1 is a perspective view of the fastening device;

FIG. 2 is a similar view showing the parts of the device in exploded relation;

FIG. 3 is a side elevational view, partly in cross-section along a vertical plane passed through the stud axis;

FIG. 4 is a bottom plan view of the device;

FIG. 5 is a cross-section view taken on line 5—5 of FIG. 3,

FIG. 6 is a cross-section of a modified fastening device;

FIG. 7 is a cross-section of another modified fastening device, and

FIG. 8 is a schematic view showing the distribution of forces on the parts of the device.

DESCRIPTION OF THE PREFERRED EMBODIMENT

Referring now by reference numerals to the drawings and first to FIGS. 1, 2 and 3 it will be understood that the fastening device is generally indicated by numeral 10 which is threadedly attached to a base 12.

The component parts of the device include a stud 14 which is threadedly attached to the base 12 and provides a rotational axis for a load attaching means. As shown, the load attaching means includes a swivel load ring 16 and an eye member 18, said eye member being pivotally mounted to the load ring 16 as by pivot pins 20 held in place by lock pins 22.

Load from the eye member 18 is transferred to the stud 14 by a bushing member 24 and a washer or collar 26 and the component parts of the device are held in assembly prior to installation by a retainer member 28.

As best shown by reference to FIGS. 3, 5 and 8 the stud 14 includes an enlarged head 30, which is engageable with the collar 26, and a partially threaded shank 32 received within the base 12 which is typically a metal plate having a ground attaching means. In the embodiment shown, the base 12 is a metal plate having a threaded opening 33 receiving the lower threaded portion 34 of the shank while an upper, adjacent threaded portion 35 and an unthreaded portion 36 are disposed above the base 12.

The bushing member 24 is generally cylindrical and includes an annular flange 37 providing a lower end bearing portion 35 engageable with the base 12, a recessed, inclined annular abutment 38 and an upper margin 39 providing an upper end bearing portion engageable by the collar 26. The load ring 16 is of a thickness to be received in clearance relation between the collar 26 and the bushing member 24 in conformance with the line of action of the force P applied to the load ring 16.

As best shown in FIG. 8 the bushing member 24 includes an outer surface providing a cylindrical bearing portion 40 and an inner surface having a lower cylindrical bearing portion 42 and an upper cylindrical portion 44. The load ring 16 includes an inner surface having a cylindrical portion 46, which is bearingly engageable with the bearing portion 40 of the bushing member 24.

The inner, retainer member 28, includes an outer surface having a lower cylindrical portion 50 engageable with the bushing member lower bearing portion 42, and an upper reduced diameter cylindrical portion 52 spaced from the upper portion 44 of the bushing member 24. The retainer member 28 also includes an inner surface having a lower threaded portion 54, threadedly engageable with the stud threaded portion 34, an upper enlarged diameter unthreaded portion 56 spaced from the shank unthreaded portion 36 and an upper margin 58 engageable with the underside of the stud head 30. The retainer member 28 also includes an outwardly extending annular flange 60 having an inclined upper face 62 engageable with the inclined abutment face 38 of the bushing member 24.

Because of the above described arrangement of component parts the inner bearing portion 46 of the ring 16 is engageable with the outer bearing portion 40 of the bushing member 24. However, only the lower bearing portion 42 of the bushing 24 is engageable with the lower bearing portion 50 of the retainer member 28 and only the lower threaded portion 54 of the retainer member 28 is engageable with the stud threaded portion 34. The upper portions 56 and 52 of the retainer member 28 are not engageable with the stud shank 36 and the upper portion 44 of the bushing member respectively, when the retainer member 28 is received within the collar opening 64 with its upper margin 58 engaged with the underside of the stud head 30 thereby reducing the elevation of the line of action of the load transferred from the attaching means.

A modified fastening device 10a is illustrated in FIG. 6. In this device all of the parts, except for the bushing member 24a and the retainer member 28a, the component parts are identical to those described with respect to the device illustrated in FIGS. 1-5 and 8. Accordingly, these parts and parts of the bushing member 24a and retainer member parts 28a which are substantially unchanged will be given the same reference numerals. Bushing member and retainer member parts which are substantially changed will be given a reference numeral suffix "a".

In this modified device the bushing member 24a is similar to the bushing member 24 described above except that the annular flange indicated by number 37a, engageable with the base 12, is provided with a recessed horizontal annular abutment face 38a. The retainer 28a is similar to the retainer member 28 described above except that, in lieu of the outwardly extending flange 60 a snap ring 60a is provided interfitting a groove 61a. The snap ring 60a provides a horizontal upper surface 62a engageable with the horizontal abutment face 30a of the bushing member 24a. As in the case of the first embodiment this arrangement of component parts provides that the inner bearing portion 46 of the ring 16 is engageable with the outer bearing portion 40 of the bushing member 24a. However, only the lower bearing portion 42 of the bushing member 24a is engageable with the lower bearing portion 50 of the retainer member 28a and only the lower threaded portion 54 of the retainer member 28a is engageable with the stud threaded portion 34. As with the original device the result of this structural arrangement of parts is that the elevation of the line of action of the load transferred from the attaching means is reduced.

Another modified fastener device 10b is illustrated in FIG. 7. In this device also, all of the parts, except for the bushing member 24b and the retainer member 28b, are the same as those described with reference to the device illustrated in FIGS. 1-5 and FIG. 8. Accordingly, these parts and parts of the bushing member 24b and retainer member 28 which are substantially unchanged will be given the same reference numerals. Bushing and retainer member parts which are substantially changed will be given a reference numeral suffix "b" or a new reference numeral.

In this modified device the bushing member 24b is essentially similar to the bushing member 24 described with respect to the original device except that the annular flange indicated by numeral 37b, engageable with the base 12, is provided with a recessed horizontal abutment face 38b. The upper portion of said bushing member 24b includes an inwardly extending annular flange 70 providing an annular end margin 72 engageable with the collar 26 and having a horizontal annular abutment face 74. Retainer member 28b is similar to the retainer member 28 in that it includes a threaded inner face 54b engageable with the stud threaded portion 34 and an outer face having a bearing portion 50b engageable with the lower bearing portion of the bushing member 24b. Retainer member 28b distinguishes from retainer member 28 by having an upper annular bearing face 76 which is engageable with the bushing member abutment face 74. The above described arrangement of component parts provides that the inner bearing portion 46 of the ring 16 is engageable with the outer bearing portion 40 of the bushing member 24b. Again, only the lower bearing portion 42 of the bushing member 24b is engageable with the bearing portion 50b of the retainer member 28b and the threaded portion 54b of the retainer member 28b is engageable with the stud threaded portion 34. As with the two devices already described the result of this structural arrangement of parts is that the elevation of the line of action of the load transferred from the attaching means is reduced.

It is thought that the structural features and functional advantages of this fastening device have become fully apparent from the foregoing description of parts but, for completeness of disclosure the operation of the device, and interaction of the components will be briefly described with particular reference to the device described in FIGS. 1-5 and 8.

As will be readily understood by reference to FIGS. 3, 4 and 5, prior to installation, the stud 14, the load ring 16, the bushing member 24 and the collar 26 are maintained in assembly by virtue of the flanged retainer member 28, said member being threaded into position following assembly of said stud, ring, collar and bushing, until it engages or "bottoms out" against the underside of the stud head 30. As shown in FIG. 4, the retainer member 28 includes tool receiving apertures 66 to facilitate installation. As shown in FIGS. 3 and 5, there is a slight lateral clearance between the retaining member 24 and the collar 26 in the assembled condition.

With the components assembled as described the stud 14 can be threadedly connected within the base threaded opening 33 until the collar 26 bears down upon the bushing members 24 and the bushing flange 38 bears upon the surface of the base 12. At this point the collar 26 and bushing member 24 are, to all intents and purposes, substantially integrally formed and provide a groove, defined by the collar 26 and bushing flange 37 about which the load ring 16 can freely rotate.

When a load P is applied to the eye member 18 as shown in FIG. 5, component horizontal and vertical forces H and V respectively are transmitted to the stud 14. The vertical force V is carried by the stud 14 and the horizontal force H produces a turning moment $M_1$. The turning moment $M_1$ tends to be resisted by a force couple $M_2$ provided by a tension force on the stud 14 and a bearing force on the bushing flange 38 both of which are equal to C.

Stated mathematically, if the turning moment $M_1 = Hy$ and the resistance couple $M_2 = Cx$ then, when the two members are in balance and $M_1 = M_2$, $Hy = Cx$ and $C = Hy/x$. Where:

H = horizontal component of load P;
Y = height of the point of application of H;
C = resistance force, and
X = force couple arm.

Thus, it can be seen that the force C applied to the flange 37 is a function of the height of force H and also the diameter of the bushing member flange 37.

It is therefore an advantage to reduce y, the height of the line of action of force H. The structural arrangement of parts by which this is achieved in the preferred embodiment is best shown in FIG. 8 which is a laterally separated schematic rendering. As shown in FIG. 8, the horizontal component of force from the load ring 16 is transmitted from the load ring inner bearing portion 46 to the stud shank threaded portion 34 through the medium of the bushing member outer and inner bearing portions 40 and 42, the retainer member outer bearing portion 50 and inner threaded portion 54. There is no corresponding transmission of force between, the bushing member upper portions 41 and 44, the retainer member outer and inner upper portions 52 and 56 and the unthreaded upper portion 36 of the stud shank 32.

Because of the above structural relationship of parts, and the consequent lowering of the height of the line of action of the load component force H, the bearing load of the base 12 under the bushing member flange 37 is effectively reduced. Further, the configuration of the flanged retainer member 28, by providing a flanged lower end, effectively supports the bushing member 24 and hence the assembly as a whole prior to installation without a reduction in the effective diameter of the stud shank 32.

With respect to the modified device 10a illustrated in FIG. 6 it will be understood that, prior to installation, the stud 14, the load ring 16, the bushing member 24a and the collar 26 are maintained in assembly by virtue of the retainer member snap ring 60a which functions in substantially the same manner as the retainer member flange 60 of the device 10 discussed above. In other respects, the fastener device 10a functions in substantially the same manner as described with respect to fastener device 10.

With respect to the other modified device 10b illustrated in FIG. 7, it will be understood that, prior to installation, the stud 14, the load ring 16, the bushing 24b and the collar 26 are maintained in assembly by virtue of the retainer member annular bearing face which is threaded into position substantially as shown in FIG. 7 retaining member 28b including tool receiving appertures 66 to facilitate installation and the annular bearing face 76 is engageable with the bushing member abutment face 74 to hold the component parts in assembly. In other respects the fastener device 10b functions in substantially the same manner as described with respect to fastener devices 10 and 10a.

I claim as my invention:

1. A fastening device for anchoring a load to a threaded base, the fastening device comprising:
    (a) a stud including a head and a shank, said shank having a lower threaded portion adapted to be fastened to the base and an adjacent, upper threaded portion,
    (b) a retainer member including an inner surface having a threaded portion, adapted to be received by the stud upper threaded portion, and an outer surface having a bearing portion,
    (c) a bushing member including an inner surface having a bearing portion operatively engageable with the outer bearing portion of the retainer member and an end bearing portion operatively engageable with the base,
    (d) interengageable means on each of said members engageable to limit relative longitudinal movement between said members, and
    (e) load attaching means operatively connected to the bushing member in swivel relation for transferring applied load to the bushing member and the stud.

2. A fastening device as defined in claim 1, in which:
    (f) the retainer member outer surface bearing portion is cylindrical, and
    (g) the bushing member inner and outer bearing surfaces are cylindrical.

3. A fastening device as defined in claim 1, in which:
    (f) the retainer member inner surface includes a cylindrical portion providing the threaded portion and the retainer member outer surface includes a cylindrical portion providing the bearing portion, and
    (g) the bushing member inner surface includes a cylindrical lower portion providing the bearing portion.

4. A fastening device as defined in claim 1, in which:
    (f) the retainer member inner surface includes a cylindrical lower portion providing the threaded portion and the retainer member outer surface includes a cylindrical lower portion providing the bearing portion, and
    (g) the bushing member inner surface includes a cylindrical lower portion providing the bearing portion.

5. A fastening device as defined in claim 1, in which:
    (f) the interengageable means between the bushing member and the retaining member includes a circumferentially disposed transverse bearing face provided on one of said members and an overlappingly related transverse abutment face provided on the other of said members.

6. A fastening device as defined in claim 1, in which:

(f) the interengageable means between the bushing member and the retaining member includes an annular transverse bearing face provided on one of said members and a cooperating annular bearing face provided on the other of said members.

7. A fastening device as defined in claim 5, in which:
(g) the bushing member includes a recessed annular abutment providing the transverse bearing face and the retainer member includes an outwardly extending annular flange providing the transverse bearing face.

8. A fastening device as defined in claim 7, in which:
(h) the bushing member bearing face and the retainer member bearing face are inclined relative to the axis of the stud.

9. A fastening device as defined in claim 5, in which:
(g) the retainer member inner surface includes a cylindrical lower portion providing the threaded portion and the retainer member outer surface includes a cylindrical lower portion providing the bearing portion,
(h) the bushing member inner surface includes a cylindrical lower portion providing the bearing portion, and
(i) the bushing member includes a recessed annular abutment providing the transverse bearing face and the retainer member includes an outwardly extending annular flange providing the transverse bearing face.

10. A fastening device as defined in claim 7, in which:
(h) the retainer member includes an exterior retaining ring providing the annular flange.

11. A fastening device as defined in claim 5, in which:
(g) the retainer member inner surface includes a cylindrical lower portion providing the threaded portion and the retainer member outer surface includes a cylindrical lower portion providing the bearing portion,
(h) the bushing member inner surface includes a cylindrical lower portion providing the bearing portion, and
(i) the retainer member includes an exterior retaining ring providing the annular flange.

12. A fastening device as defined in claim 5, in which:
(g) the bushing member includes an inwardly extending flange providing the transverse bearing face and the retainer member includes a cylindrical nut having an upper annular margin providing the retainer member transverse bearing face.

13. A fastening device as defined in claim 5, in which:
(g) the retainer member inner surface includes a cylindrical portion providing the threaded portion and the retainer member outer surface includes a cylindrical portion providing the bearing portion,
(h) the bushing member inner surface includes a cylindrical lower portion providing the bearing portion, and
(i) the bushing member includes an inwardly extending annular flange providing the transverse bearing face and the retainer member includes a cylindrical nut having an upper annular margin providing the retainer member transverse bearing face.

14. A fastening device as defined in claim 12, in which:
(h) the retainer member has a length substantially less than the length of the bushing member.

15. A fastening device for anchoring a load to a threaded base, the fastening device comprising:
(a) a stud including a head and a shank, said shank having a lower threaded portion adapted to be fastened to the base and an adjacent, upper threaded portion,
(b) a retainer member including an inner surface having a threaded portion, adapted to be received by the stud upper threaded portion, and an outer surface having a cylindrical bearing portion,
(c) a bushing member including an inner surface having a cylindrical bearing portion operatively engageable with the outer bearing portion of the retainer member and an end bearing portion operatively engageable with the base, and
(d) load attaching means operatively connected to the bushing member in swivel relation for transferring applied load to the bushing member and the stud.

* * * * *